S. ZUCHTMANN.
LOCK NUT.
APPLICATION FILED AUG. 8, 1908.
937,269. Patented Oct. 19, 1909.
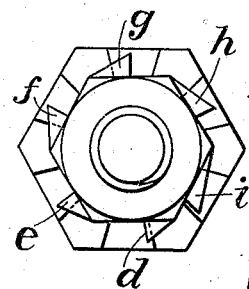
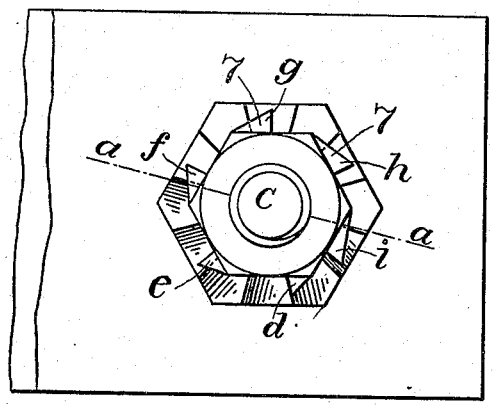
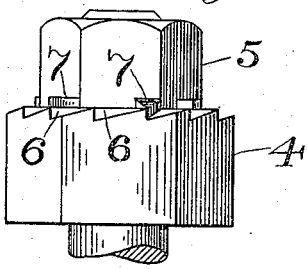
Witnesses:
David J. Walsh
Inventor
Simon Zuchtmann
By his Attorney
Albert Steten

UNITED STATES PATENT OFFICE.

SIMON ZUCHTMANN, OF NEW YORK, N. Y.

LOCK-NUT.

937,269.  Specification of Letters Patent.  Patented Oct. 19, 1909.

Application filed August 8, 1908. Serial No. 447,501.

*To all whom it may concern:*

Be it known that I, SIMON ZUCHTMANN, a citizen of the United States, and resident of New York, in the county of New York and State of New York, have invented certain new and useful Improvements in Lock-Nuts, of which the following is a specification.

My invention relates to lock-nuts and to bolts adapted to be used therewith.

It relates particularly to a lock-nut composed of two members, one member being a nut whose contact surface with the second member is provided with a series of notches adapted to be engaged by one or more of a series of wings, or projections connected to or integral with the upper nut.

The object of my invention is to furnish a self-locking nut which shall be easily and cheaply made, rapidly and easily adjusted and securely locked when once set in position.

To carry out my invention, I provide a lock nut consisting of two interlocking members, one right-threaded, the other left-threaded, and with these I combine a double-threaded bolt, of a construction hereinafter to be described.

In the accompanying drawings, forming part of this specification: Figure 1 is a plan view looking down from above; Fig. 2 is a longitudinal section through the nut of Fig. 1, on the line $a$—$a$, showing an elevation of the two-threaded bolt; Fig. 3 is a side elevation of the nuts, showing the interlocking notches and wings; Fig. 4 is a diagrammatic plan view, showing the wings and notches in another position than in Fig. 1.

Referring to the drawings: 1 is a bolt on which are cut two threads, one 2 right-handed, the other 3 left-handed. The threads of the nuts 4 and 5 are cut correspondingly right and left handed. On the upper surface of nut 4 are cut a number of notches, which are of equal angular width measured from the center $c$. On the upper nut are fashioned a series of wings 7. These wings 7 are not situated at equal angular distances from each other, but are spaced according to a ratio hereinafter set forth.

To put the lock-nut in operation, the nut 4 is firmly set down on the object 9; the nut 5, of an opposite thread, is then set firmly down on the nut 4, then the wing found nearest to a notch is brought down or arranged to come down by itself, and the nuts are securely locked. If nut 4 tends to turn in such a direction as to loosen itself, the interaction of wing and notch will tend to tighten up nut 5, thus counteracting the loosening tendency of the nut as a whole. If the wings on nut 5 (as shown in Fig. 4) were equally spaced, and there were lack of correspondence between any notch and a wing when on the bolt, there would be the same variation between all of them, and it might be necessary, in order to lock the nuts, to turn nut 5 through a considerable angle. To remedy this, and lessen the angular displacement necessary to secure interlocking, I proceed as follows: I make a number of notches on the upper surface of 4, and I space them at equal angular distances apart. The wings on 5 are so arranged that one wing will always correspond with a notch within less than a fraction of the angular width of a single notch, which fraction will have for its denominator the number of the wings and for its numerator, the number 1. For example, if the number of the notches be 12, and the number of the wings on nut 5 be 6, then to each of 5 of the angular spaces of the wings I add one-sixth of the angular width of one notch, or since there are 12 notches, and each notch occupies an angle of 30 degrees, (360 divided 12), I add 5 degrees to each of the 5 wings, making them 65 degrees apart, and leaving the last one but 35 degrees, or occupying an angular space one-sixth larger than the angular space of a single notch. Hence to bring some one wing into agreement with a notch, it will never be necessary to displace the nut 5 more than one-sixth of the angular width of a notch, or 1-6th. of 1-12th. of a circle, or 1-72d. of a circle. In Fig. 1 wing $d$ is shown just coinciding with a notch, while $e$ is displaced 1-6th.; $f$, 2-6th.; $g$, 3-6th.; $h$, 4-6th. and $i$, 5-6th. of the angular width of a notch. Assume the condition shown in Fig. 4, that is, $d$ has not reached to, or has come to rest at, such a point that $d$ and $i$ are only 1-12th. of the angular notch-width out of correspondence with the notch; then it will be necessary to turn the nut 5, 1-12th. of a notch, or 1-144th. of a circle. Thus my arrangement and my wing and notch ratio enable me to make a more positive lock-nut, which is capable of more accurate adjustment than the devices now in ordinary use. Any number of notches may be fashioned in the lower nut, and a number of wings must then be so arranged that one of them will always be within less than a fraction of the angular width of a single notch, whose denominator is the number of the wings and whose numerator is the number 1.

Having thus fully illustrated and described my invention, what I claim is:

In combination, a bolt having oppositely-threaded portions, two nuts, one on lower threaded portion having ratchet teeth, the other having integral wings adapted to be bent into engagement with teeth on the lower nut, the notches and wings being so spaced angularly that one will always correspond with a notch within less than a fraction of the angular width of a single notch equal to unity divided by the number of wings.

SIMON ZUCHTMANN.

Witnesses:
A. STETSON,
ROSE RANDELL.